(12) United States Patent
Chen et al.

(10) Patent No.: US 6,170,319 B1
(45) Date of Patent: *Jan. 9, 2001

(54) METHODS AND APPARATUS FOR MONITORING WATER PROCESS EQUIPMENT

(75) Inventors: Haiwen Chen, Holland, PA (US); Ke Hong, Kendall Park, NJ (US); John C. Gunther, Bensalem, PA (US)

(73) Assignee: Betzdearborn Inc., Trevose, PA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/052,031

(22) Filed: Mar. 31, 1998

(51) Int. Cl.⁷ .................................................. G01M 3/04
(52) U.S. Cl. ............................................................. 73/40.7
(58) Field of Search ................... 73/40.5, 40.7, 73/49.1; 250/302

(56) References Cited

U.S. PATENT DOCUMENTS

| | | | |
|---|---|---|---|
| 3,447,895 | 6/1969 | Nelson et al. | 23/48 |
| 4,462,319 | 7/1984 | Larsen | 110/238 |
| 4,498,333 | 2/1985 | Parthasarathy | 73/40.5 A |
| 4,502,322 | 3/1985 | Tero | 73/40.5 A |

(List continued on next page.)

OTHER PUBLICATIONS

"Black Liquor Recovery Boiler Advisory Committee Recommended Emergency Shutdown Procedure (ESP) and Procedure for Testing ESP System for Black Liquor Recovery Boilers", BLRBAC, Oct. 1993.

Buckner et al., "Design and Implementation of a Commercial Acoustic Leak–Detection System for Black Liquor Recovery Boilers", TAPPI Journal, 121, Jul., 1990.

Boyette et al., "An Automated Coordinated Phosphate/pH Controller for Industrial Boilers", Presented at NACE Corrosion '95, Mar., 1995.

Durham et al., "Black Liquor Recovery Boiler Leak Detection: Indication of Boiler Water Loss Using a Waterside Mass Balance Method", Presented at TAPPI '95, in Sep. 1995.

Clevett, K. J., Process Analyzer Technology, John Wiley & Sons, New York, 1986, 872–876.

Grace, T. M., "Acoustic Leak Detection—One Answer to a Need", PIMA, 53, Dec., 1988.

Racine et al., "An Expert System for Detecting Leaks in Recovery—Boiler Tubes", TAPPI Journal, 147, Jun., 1992.

Hoefs et al., "Using Inert Waterside Tracers as Part of an Overall Black Liquor Recovery Boiler Leak Indication Strategy", Sep. 1996, Gulf Coast TAPPI Meeting.

* cited by examiner

Primary Examiner—Eric S. McCall
Assistant Examiner—Jewel V. Thompson
(74) Attorney, Agent, or Firm—Greenblum & Bernstein, P.L.C.

(57) ABSTRACT

Methods and apparatus are provided for detection of leaks in boilers containing a temperature control liquid which is supplemented with feedwater and removed as blowdown. The methods include measuring rates associated with the feedwater supplementation and blowdown, adding a tracer to the temperature control liquid, determining the change in rate of the feedwater supplementation, determining the mass of the temperature control liquid, deriving the change in concentration of the chemical tracer in the temperature control liquid, calculating the unaccounted for water rate and comparing this rate with zero to determine if a leak condition is present.

22 Claims, 1 Drawing Sheet

U.S. PATENT DOCUMENTS

| | | | |
|---|---|---|---|
| 4,783,314 | 11/1988 | Hoots et al. | 422/3 |
| 4,897,797 | 1/1990 | Free, Jr. et al. | 364/500 |
| 4,966,711 | 10/1990 | Hoots et al. | 210/697 |
| 5,041,386 | 8/1991 | Pierce et al. | 436/50 |
| 5,148,775 | 9/1992 | Peet | 122/451 R |
| 5,200,106 | 4/1993 | Hoots et al. | 250/275 |
| 5,304,800 * | 4/1994 | Hoots et al. | 250/302 |
| 5,320,967 * | 6/1994 | Avallone et al. | 436/50 |
| 5,363,693 * | 11/1994 | Nevruz | 73/40.5 |
| 5,411,889 | 5/1995 | Hoots et al. | 436/6 |
| 5,416,323 | 5/1995 | Hoots et al. | 250/302 |
| 5,565,619 | 10/1996 | Thungstrom et al. | 73/40.7 |
| 5,696,696 | 12/1997 | Gunther et al. | 364/500 |

METHODS AND APPARATUS FOR MONITORING WATER PROCESS EQUIPMENT

FIELD OF THE INVENTION

The present invention is directed to methods and apparatus for monitoring industrial water process equipment. More particularly, the invention is directed to the detection of leaks in water process equipment such as black liquor recovery boilers.

BACKGROUND OF THE INVENTION

A boiler is an apparatus in which water or some other aqueous temperature control liquid to which makeup water is added and from which blowdown is removed is vaporized into steam by the application of heat from a furnace or heat-generating process system. In most instances, the temperature control liquid is brought into close, indirect contact with the process system to facilitate heat transfer. Leakage in a boiler can result not only in contamination and fouling of the temperature control liquid and the process system, but also in undesired physical reactions. This is particularly true for the black liquor recovery boilers used in many paper mills. In black liquor recovery boilers, the escape or leakage of aqueous temperature control liquid from the so-called "water side" of the boiler into the hot, highly caustic "fire side" can result in violent explosions.

The prior art provides numerous techniques for monitoring and controlling leaks in black liquor recovery boilers and other boiler systems. These methods use various techniques, most notably two classes of mass balance methods, chemical tracer and water mass balances. For example, U.S. Pat. No. 5,363,693, Nevruz, teaches methods and apparatus for detecting leakage from recovery boiler systems using mass balance of water flows into and out of the boiler. The method then calculates the long and short term statistics for the drum balance of mass flow. From these calculations a t-test function is calculated to see if both long term and short term moving average of drum balances are significantly different, which in turn indicates whether a boiler leak is occurring. While water mass balance leak detection systems can be effective, as described in U.S. Pat. No. 5,663,489 (Thungstrom et al.), they are generally less sensitive than chemical tracer systems and do not discriminate between leaks in critical and non-critical portions of the boiler.

U.S. Pat. No. 5,320,967 (Avallone et al.) is an example of the other mass balance method, namely chemical tracers. Avallone discloses a boiler system leak detection method that involves introducing an inert tracer to the boiler in a known and uniform proportion to the feedwater, sensing a characteristic of the tracer in the boiler at steady state, converting the sensed characteristic to a value equivalent to the concentration of the tracer in the temperature control liquid, and activating a signal when there is excessive variance in the concentration of the tracer. However, the method disclosed by Avallone et al. is limited by its requirement that the tracer be detected (sensed) when the boiler is at steady state, which is said to occur only when there is no significant change in any of five process parameters: the concentration of the tracer in the boiler; the blowdown rate; the feedwater rate; the rate of feeding tracer to the boiler; and the steam rate in the absence of boiler leakage.

U.S. Pat. No. 5,565,619, Thungstrom et al. teaches methods and apparatus for monitoring boilers for leaks. The methods utilize a tracer compound which is added to the boiler water at a rate that is proportional to the blowdown water rate. The expected concentration of the tracer exiting the boiler is calculated utilizing non-equilibrium condition variables and compared to the actual concentration of tracer in the blowdown. If there is a statistically significant difference between actual and expected concentrations, a leak condition is indicated.

While this chemical tracer method is an improvement over Avallone in that the boiler does not need to be at steady-state in order to detect leaks, two issues have been discovered related to this method. First, this method assumes that boiler water mass is constant as steam load changes. With very small leaks, changes in boiler water mass with load changes can lead to false alarms due to changes in the tracer concentration. Second, it is difficult to apply statistical methods to the output of the method.

Consequently, there remains a need in the art for a chemical tracer-based leak detection system that does not assume that boiler water mass is constant and can operate with an automatic water level controller. Further, there is a need for a chemical tracer-based leak detection system whose output can be used with statistical methods.

SUMMARY OF THE INVENTION

The present invention provides for methods and apparatus for the detection of leaks in boilers to which a temperature control liquid is added and from which liquid is removed. The temperature control liquid is supplemented with feedwater and removed as blowdown. These rates of supplementation and removal are measured. The mass of liquid in the boiler is calculated. In a preferred embodiment, a tracer chemical is added to the temperature control liquid, and its feedrate and blowdown concentration are measured.

By determining the change in the feedwater supplementation rate and the change in concentration of chemical tracer in the boiler water, these numbers can be combined with the rate, mass and concentration measurements to determine the unaccounted for water rate (i.e., leak).

BRIEF DESCRIPTION OF THE DRAWING

The accompanying

DETAILED DESCRIPTION OF THE INVENTION

Figure 1:
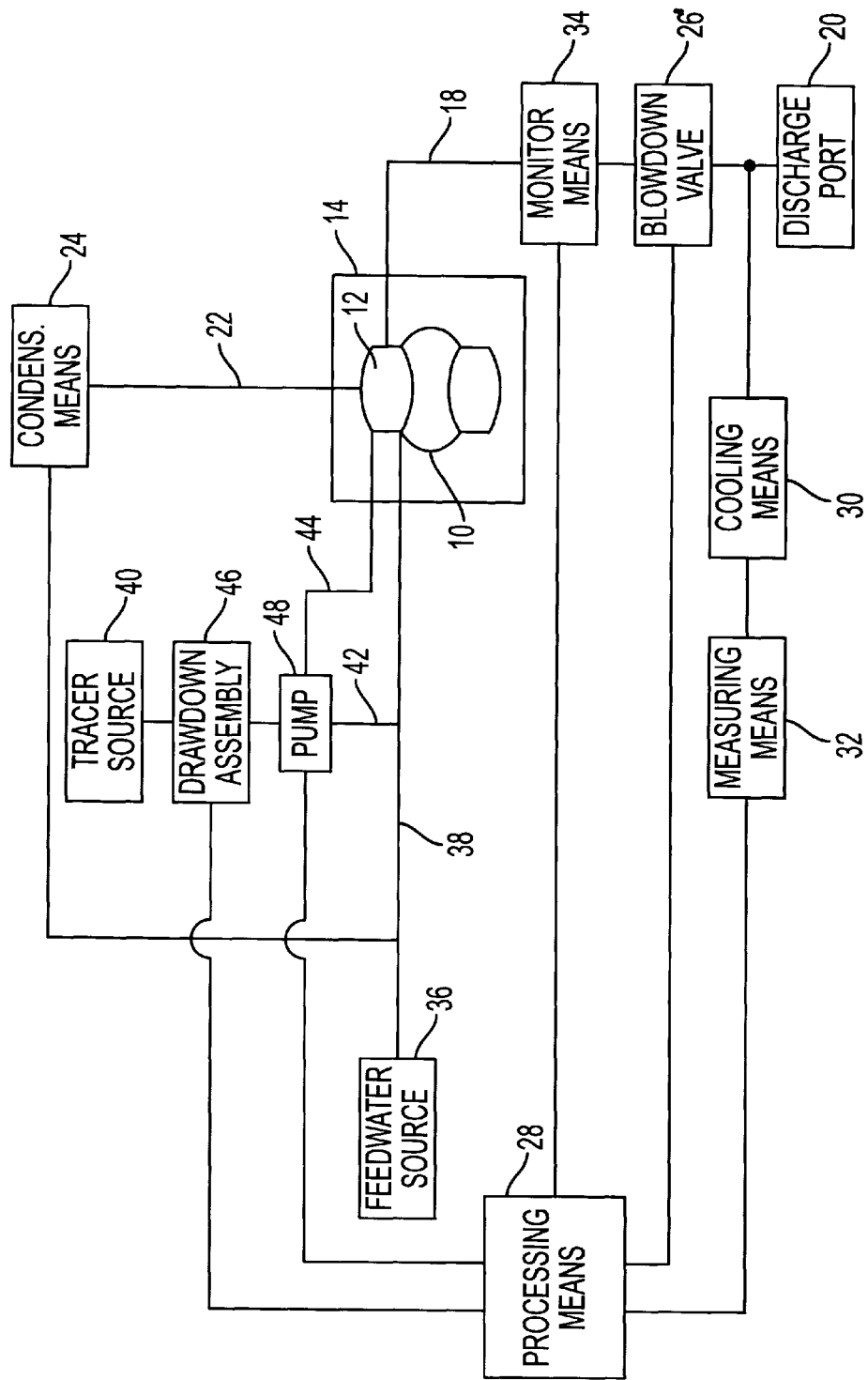
FIG. 1 is a schematic representation of a boiler monitoring system according to the invention.

The present invention provides for methods and apparatus for detecting a leak in a boiler having an automatic liquid level control mechanism in which a temperature control liquid in a containment means is supplemented with feedwater and is removed as blowdown comprising the steps of:

a) measuring a rate associated with the addition of a chemical tracer to said temperature control liquid;

b) measuring the concentration of chemical tracer in said temperature control liquid;

c) measuring a rate associated with said blowdown;

d) measuring a rate associated with said feedwater supplementation;

e) determining the change in rate of said feedwater supplementation by taking the derivative of said feedwater supplement at ion with respect to time;

f) determining the mass of said temperature control liquid in said containment means;

g) determining the change of concentration of said chemical tracer in said temperature control liquid by taking the derivative of said chemical tracer concentration with respect to time;

h) determining the unaccounted for water rate by dividing the rate obtained in step (a) with the concentration obtained in step (b), and subtracting from that determination the rate obtained in step (c), the rate change obtained in step (e) and the mass obtained in step (f) multiplied by the change in concentration obtained in step (g) divided by said concentration;

i) comparing said unaccounted for water rate with zero; and j) indicating a leak condition if said unaccounted for water rate is greater than zero, preferably statistically significantly greater than zero.

The present invention also provides for apparatus for detecting leaks in boiler systems. The apparatus according to the present invention comprises:

a) measuring means in communication with chemical tracer addition means;

b) concentration determination means in communication with the temperature control liquid;

c) measuring means in communication with the blowdown means;

d) measuring means in communication with the feedwater supplementation means;

e) derivation means in communication with said feedwater addition means for deriving the change of the feedwater rate with respect to time;

f) mass derivation means in communication with blowdown, chemical tracer addition and concentration determination means;

g) derivation means in communication with the chemical tracer concentration determination means for deriving the change of concentration with respect to time;

h) unaccounted for water rate determination means in communication with the chemical tracer addition means, the concentration determination means, the blowdown measuring means, the feedwater rate change derivation means, the mass derivation means, and the chemical tracer derivation means; and i) comparison means in communication with the unaccounted for water rates means to determine if a leak exists.

The methods and apparatus of the present invention can be used to monitor virtually any type of equipment to which liquid is added and from which liquid is removed. The methods and apparatus of the invention preferably are used to monitor boilers, especially black liquor recovery boilers. Representative boilers are disclosed by U.S. Pat. Nos. 3,447,895 (Nelson et al.), 4,462,319 (Larson), 4,498,333 (Parthasarathy), and 4,502,322 (Tero), the contents of which are incorporated herein by reference.

An exemplary monitoring system according to the invention is shown in FIG. 1, wherein a first ("water side") containment means or "boiler" 10 containing temperature control liquid 12 is adjacent to and in thermal communication with a second ("fire side") containment means 14 that typically contains hot vapors and a molten smelt bed. Boiler 10 is in fluid communication with blowdown line 18 for the discharge of blowdown to discharge port 20 and with steam line 22 for the discharge of steam to condensation means 24. The discharge of blowdown is controlled through actuation of blowdown valve 26, which can be operated manually or under the control of an external computer or some other processing means (not shown). It is not necessary that the blowdown valve be under control of the system of the invention. Between boiler 10 and valve 26, blowdown line 18 is in fluid communication with monitoring means 34 to provide information on the blowdown flow rate. Downstream of valve 26, part of the blowdown flow is diverted to cooling means 30 for sampling and analysis. Measuring means 32, such as an on-line analyzer based upon UV/visible spectroscopy, is downstream of cooling means 30 to provide means for determining the concentration of tracer in the blowdown. Measuring means 32 and 34, in turn, are in electrical communication with processing means 28.

Blowdown flow monitor 34 can use any number of flowmeters designed for high temperature liquid use including orifice plate meters, vortex-shedding meters, flow nozzle meters, venturi meters, strain gauge meters, doppler (transit time) meters, turbine meters, mag meters, and pitot-type devices. Cooling means 30 can be any number of sample coolers with sufficient cooling water flowing through it to lower the sample water temperature to ambient. The selected measuring means 32 depends on the tracer being used. For example, with a molybdate tracer a FPA 800 analyzer manufactured by Tytronics (Waltham, Mass.) can be used. Alternatively, if a phosphate is used as a combined tracer and treatment chemical, a Hach (Loveland, Colo.) Series 5000 phosphate analyzer can be used.

Boiler 10 also is in fluid communication with feedwater source 36 via feed line 38. As shown in FIG. 1, feed line 38 is in fluid communication with tracer source 40 via chemical feed line 42. Alternatively, tracer source 40 is directly coupled with boiler 10 via chemical feed 44. In either embodiment, the absolute amount of tracer added to boiler 10 is controlled and recorded by processing means 28. Tracer source 40 can contain tracer or a mixture of tracer and other treatment chemicals to be fed to the boiler. Downstream of tracer source 40, a flow measurement apparatus ("drawdown assembly") 46 provides a precise measurement and control of tracer flow being injected into the feedwater line 38 via an electrically driven pump 48. Both drawdown assembly 46 and pump 48 are in electrical communication with processing means 28. Drawdown assembly 46 provides a feedback signal to processing means 28 which, in turn, controls the pumping rate of pump 48 to ensure a verified feed of chemicals to feed lines 42 or 44. Processing means 28 and associated drawdown assembly 46 preferably are constructed in accordance with the teachings of U.S. Pat. No. 4,897,797, assigned to the same assignee as this invention and incorporated by reference herein.

During normal operation, the controlled addition of feedwater to boiler 10 compensates for the removal of blowdown and steam, and maintains a desired volume of temperature control liquid 12 within boiler 10. In accordance with the present invention, the temperature control liquid is further supplemented with a known amount of at least one tracer. Tracers according to the invention are organic and/or inorganic compounds that are soluble in the feedwater, temperature control liquid, and blowdown under the operating conditions encountered. Tracers also should be thermally stable and non-volatile. In certain embodiments, the selected tracer is a reactive chemical treatment added to the boiler to, for example, control corrosion or the deposition of scale. In other embodiments, the tracer is substantially nonreactive with (i.e., inert to) the feedwater, temperature control liquid, blowdown, and contacted surfaces of the process equipment. It is preferred that the feedwater introduced to the process equipment upstream of tracer injection be substantially free of tracer, i.e., that it contain less than about 0.002 ppm of the tracer and/or that it have a tracer concentration less than about one percent of the tracer concentration of the temperature control liquid.

Tracers according to the invention possess at least one physical property that permits their detection in samples of the blowdown. Preferred tracers absorb and/or emit measurable amounts of light (or form reaction products that absorb and/or emit measurable amounts of light) in proportion to the amount of tracer present. Tracers preferably are detectable by at least one analytical technique selected from electrochemistry, UV/visible spectrophotometry, or fluorescence emission spectroscopy. Representative tracers include the tracers disclosed in U.S. Pat. Nos. 4,783,314 (Hoots et al.), 4,966,711 (Hoots et al.), 5,041,386 (Pierce et al.), 5,200,106 (Hoots et al.), 5,304,800 (Hoots et al.), and 5,320,967 (Avallone et al.), the contents of which are incorporated herein by reference. Preferred tracers are lithium-, and phosphate-containing chemical treatment and transition metal compounds, including salts, ions, oxyanions, cations, and complexes of metals belonging to Group VII of the Periodic Table. Particularly preferred are molybdenum-containing compounds, including molybdenum salts such as sodium molybdate.

Tracers can be added to the temperature control liquid in any number of ways. For example, tracer-containing solutions can be added directly to the temperature control liquid, they can be pre-mixed with feedwater that is added to the temperature control liquid, or they can be pre-mixed with treatment chemicals and then added to the feedwater. In general, the amount of added tracer should be sufficient to establish a tracer concentration of from about 0.2 to about 20 ppm in the temperature control liquid and, hence, in the blowdown.

A natural consequence of steam generation in a boiler is a concentrating of incoming, non-volatile components. To control this "cycling up" effect, one or more volumes of the relatively-concentrated temperature control liquid typically are removed from the boiler as blowdown and corresponding volumes of relatively-dilute feedwater as added. In accordance with the present invention, the blowdown either is sampled at regular or irregular known intervals or is continuously monitored to determine the measured concentration of tracer contained therein. This determination can be made, for example, by directly or indirectly comparing the amount of light absorbed or emitted by the blowdown with the amount of light absorbed or emitted by standard solutions containing known concentrations of the tracer and other solutes found in the blowdown. Alternatively, the blowdown is mixed with a reagent that reacts with the tracer and imparts a color to the blowdown in proportion to its tracer concentration. The tracer concentration can be determined by comparing the color with the color of one or more standard solutions prepared by mixing solutions containing known concentrations of the tracer with the reagent.

Previous chemical mass balance methods that employ chemical tracers for leak detection suffer from certain limitations. They only compare the calculated chemical concentration in the boiler and the actual current reading. When a leak occurs, the current concentration reading will drop gradually until it reaches a predetermined limit which triggers the leak alarm. The time needed for this process is quite long (6 hours or longer).

Another concern is in false alarms caused by changes in the boiler system conditions. If the boiler is not operating under stable conditions such as during start ups, load swings and the like, the boiler water mass with change, causing the tracer chemical concentration to be different from the calculated value, and generating a false alarm. These effects will last for a certain period of time before normal functioning leak detection can resume.

Further, previous chemical mass balance methods did not allow for calculation of the leak size.

The fundamental equation of chemical mass balance is:

$$\frac{d(M*Ch)}{dt} = ChFd - (BD + LK)*Ch \quad (1)$$

where:
M=boiler water mass
Ch=chemical tracer concentration in the boiler
ChFd=chemical tracer feed rate
BD=blowdown rate
LK=unaccounted for water rate
t=time Taking the derivative on the left hand side yields:

$$\frac{dM}{dt}*Ch + M*\frac{d(Ch)}{dt} = ChFd - (BD + LK)*Ch \quad (1')$$

In boilers with automatic drum level (or liquid level) control mechanisms, the following relationship between boiler water mass (M) and feedwater input rate (FW) holds:

$$\frac{dM}{dt} = b*\frac{d(FW)}{dt} \quad (2)$$

where unit b is a time unit and is a parameter particular to the individual boiler. b can be calculated using a least squares fit on historical boiler data, for example, one month's worth of data.

Inserting equation (2) into equation (1') yields:

$$b*\frac{d(FW)}{dt}*Ch + M*\frac{d(Ch)}{dt} = ChFd - (BD + LK)*Ch \quad (2')$$

or $$LK*Ch = ChFd - BD*Ch - b*\frac{d(FW)}{dt}*Ch - M*\frac{d(Ch)}{dt} \quad (3)$$

Dividing equation (3) by chemical tracer concentration Ch, yields:

$$LK = \frac{ChFd}{Ch} - BD - b*\frac{d(FW)}{dt} - M*\frac{d(\ln(Ch))}{dt} \quad (3')$$

In practice, there is often a mismatch between the influent and effluent chemical flow related measurements. This requires the introduction of a dimensionless factor "a" to balance the chemical input and chemical output. Thus, equation (3') becomes:

$$LK = a*\frac{ChFd}{Ch} - BD - b*\frac{d(FW)}{dt} - M*\frac{d(\ln(Ch))}{dt} \quad (4)$$

where a and b are boiler dependent parameters as well as the boiler water mass, M.

Term a can be determined from measurement of chemical tracer feed rate, chemical tracer concentration and blowdown rate under conditions of no leak, no load swing and chemical tracer feed rate being stable for about 12 to 48 hours. Under these conditions, equation (4) is:

$$0 = a * \frac{ChFd}{Ch} - BD$$

or, $$a = BD * \frac{Ch}{ChFd} \quad (5)$$

Term b is the lag time between steam and feedwater, which can be calculated by finding the lag time for the maximum correlation between steam and feedwater. These need to be measured under conditions of no leak and sufficient load swing (at least either 50% of the nominal value of steam, or 70% of its possible swing range under normal conditions).

Term M is the nominal value of the boiler water mass. M can be calculated by introducing a leak with a fixed leak rate, LK, while keeping the boiler load swing free and both ChFd and BD constant (which should be done after Term a is calculated). As such, equation (4) becomes:

$$M * \frac{d(Ch)}{dt} = a * ChFd - (BD + LK) * Ch \quad (6)$$

The solution of Ch for the above first order linear differential equation is:

$$Ch(t) = \alpha * \text{Exp}\left(\frac{-(BD + LK)}{M} * t\right) + a * \frac{ChFd}{(BD + LK)} \quad (7)$$

where $\alpha$ is determined by the initial condition of equation (6).

Then, $$Ch(t) - a * \frac{ChFd}{(BD + LK)}$$

is fitted for an exponential function, $\alpha * \text{Exp}(\beta * t)$. Comparing $\beta$ and $$\frac{-(BD + LK)}{M}$$

yields:

$$M = \frac{-(BD + LK)}{\beta} \quad (8)$$

Note that the term, $$\ln\left(Ch(t) - a * \frac{(ChFd)}{(BD + LK)}\right)$$

can be fitted to a linear function, $A*t+B$, then $$M = -(BD+LK)/A \quad (8')$$

Note that Ch(t) may also be fitted to a sum of an exponential function and a constant, $\alpha * \text{Exp}(\beta * t) + \gamma$. Then, M is determined by Equation (8) but also $$a = \gamma * \frac{(BD + LK)}{ChFd} \quad (9)$$

Additionally, the leak can be simulated by increasing the blowdown rate by a fixed amount while keeping ChFd unchanged and the boiler load swing free after the boiler has reached a stable condition.

In certain situations chemical tracer may also be removed in the steam, as well as in the blowdown. This may be considered in the methods of the present invention and incorporated into equation (4) by adding the steam removal rate to the blowdown rate. If there are multiple influent and/or effluent chemical flows into/from the boiler, the method is generalized in the obvious manner.

During the initial period of many leak events, the chemical concentration in the blowdown often changes very little in response to the leak, due to the large characteristic time of the boiler system, M/(BD+LK). For such leaks, the leak induced change in the non-differentiated terms of the chemical mass balance equation will be relatively small and thus the signal-to-noise ratio of the chemical leak indicator will be dominated by how well one can estimate the derivative of the total chemical concentration within the boiler water, that is, d(M*Ch)/dt. Under such conditions, we can rewrite (4) as:

$$LK \cong -b * d(FW)/dt - M * d(\ln(Ch))/dt$$
$$= d/dt(-b * FW - M * \ln(Ch))$$

In general, given any discretely sampled function, z(t) (in our case, $z(t) = -b * FW - M * \ln(Ch)$), a common way to estimate its derivative is using backward differences:

$$z'(t) \cong (z_i - z_{i-1})/dt$$

Here dt is the time interval between samples. Begin by applying perhaps the simplest data filter, the equal weight moving average, to the sequence of such derivative estimates:

$$\text{Derivative Estimate}_i = \text{MovingAvg}((z_i - z_{i-1})/dt)$$
$$= ((z_i - z_{i-1})/dt + (z_{i-1} - z_{i-2})/dt + \ldots +$$
$$(z_{i-(N-1)} - z_{i-N})/dt)/N$$
$$= (z_i - z_{i-N})/(N * dt)$$

Note how all the $z_i$'s in the sum except the first and last ones cancel out. Thus, if only a single moving average (single filtering) of the first difference based derivative estimates is used, only information from the first and last points gets into our slope estimates. That is, any information that the points in the middle may contain about the slope is thrown away. Contrast this with an estimate of the slope based upon a least squares fit of a linear trend to the original sequence $z_i$, in which every point contributes to determining the slope.

However, we can improve this situation if we feed the sequence output from this first moving average into a second moving average (double filtering):

$$\text{BetterDerivativeEstimate} = MovingAvg(MovingAvg((z_i - z_{i-1})/dt))$$
$$= MovingAvg((z_i - z_{i-N})/(N*dt))$$
$$= ((z_i + z_{i-1} + \ldots + z_{i-(N-1)})/N -$$
$$(z_{i-N} + z_{i-N-1} + \ldots +$$
$$z_{i-N-(N-1)})/N)/(N*dt)$$

Note that the above statistic can be interpreted as the difference between the moving average of N points and the same N point moving average lagged by N points, divided by N*dt (the time between the centers of these two averaging windows). Also note how, by using double filtering, all of the data points—not just the two points at the beginning and end of the data window, contribute to, and thus help reduce the variability of, our derivative estimate.

The above statistic is a well known "easy to compute by hand" approximation of the slope of the "best fitting" trend line to all 2*N data points. However, the above slope estimate, though more statistically efficient, is not, assuming white noise errors on z(t), as efficient as the slope estimate produced by a true least squares fit.

In practice, an exponentially weighted moving average (EWMA), rather than an equal weight moving average, is often used for the data filter. Although the analysis is somewhat more complicated with the EWMA, the essential mechanism whereby double filtering improves derivative estimates—and hence leak detection—is the same. Moreover, it can be shown that the double EWMA of a first difference based derivative estimate, rather than being just an approximation of a least squares slope estimate, is a least squares slope estimate, and thus, arguably, even more efficient in estimating slope. Past methods failed to recognize the importance of such efficient derivative estimation in extracting the leak information contained in the data and thereby increasing signal to noise ratio and improving leak detection limits. Increases in the signal to noise ratio of two or more due to the use of this double filtering technique have been observed.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for detecting a leak in a boiler having an automatic liquid level control mechanism in which a temperature control liquid in a containment means is supplemented with feedwater and is removed as blowdown comprising:
   a) measuring a rate associated with addition of a chemical tracer to said temperature control liquid;
   b) measuring a concentration of the chemical tracer in said temperature control liquid;
   c) measuring a rate associated with said blowdown;
   d) measuring a rate associated with said feedwater supplementation;
   e) determining change in rate of said feedwater supplementation by taking a derivative of said feedwater supplementation with respect to time;
   f) determining mass of said temperature control liquid in said containment means;
   g) determining change of concentration of said chemical tracer in said temperature control liquid by taking a derivative of said chemical tracer concentration with respect to time;
   h) determining an unaccounted for water rate by dividing the rate obtained in (a) with the concentration obtained in (b), and subtracting from that determination the rate obtained in (c), the rate change obtained in (e) and the mass obtained in (f) multiplied by the change in concentration obtained in (g) divided by said concentration;
   i) comparing said unaccounted for water rate with zero; and
   j) indicating a leak condition if said unaccounted for water rate is greater than zero.

2. The method as claimed in claim 1 further comprising removing said temperature control liquid as steam.

3. The method as claimed in claim 1 wherein said rate in (a), (c) and (d) is in weight per time unit.

4. The method as claimed in claim 1 wherein said measurement in (a), (c) and (d) is by flow meters.

5. The method as claimed in claim 1 wherein the measurement in (b) is made by an analyzer.

6. The method as claimed in claim 1 wherein said determinations in (e) and (g) are made by a computer.

7. The method as claimed in claim 1 wherein said boiler is a black liquor recovery boiler.

8. The method as claimed in claim 1 wherein said chemical tracer is a transition metal compound.

9. The method as claimed in claim 8 wherein said chemical tracer is a molybdenum-containing compound.

10. The method as claimed in claim 9 wherein said chemical tracer is a molybdenum salt.

11. The method as claimed in claim 10 wherein said tracer chemical is sodium molybdate.

12. The method as claimed in claim 1 wherein said chemical tracer is a lithium-, or phosphate-containing chemical.

13. The method as claimed in claim 1 wherein the unaccounted for water rate is determined according to the formula:

$$LK = a * \frac{ChFd}{Ch} - BD - b * \frac{d(FW)}{dt} - M * \frac{d(\ln(Ch))}{dt}$$

where:
LK=unaccounted for water rate;
a=a boiler dependent variable;
Ch=tracer chemical concentration;
ChFd=tracer chemical feed rate;
BD=blowdown rate;
b=a boiler dependent variable;
t=time;
FW=feedwater input rate; and
M=mass of water in the containment means.

14. The method as claimed in claim 13 wherein the boiler dependent variable, a, is derived according to the formula:

$$a = BD * \frac{Ch}{ChFd}$$

where:
  BD=blowdown rate;
  Ch=tracer chemical concentration; and
  ChFd=tracer chemical feedrate.

15. The method as claimed in claim 13 wherein the relationship between M and FW is derived according to the formula:

$$\frac{dM}{dt} = b * \frac{d(FW)}{dt}$$

where:
  M is mass of water in the containment means;
  t is time; and
  FW is feedwater input rate
  where: b is calculated using a least squares fit of historical data of said boiler.

16. The method as claimed in claim 1 wherein the change calculated in (g) is derived using double filtering.

17. The method as claimed in claim 1 further comprising physically analyzing said boiler in response to a positive difference between said unaccounted for water rate and zero.

18. The method as claimed in claim 1 wherein indicating a leak condition comprises indicating a leak condition if said unaccounted for water rate is statistically significantly greater than zero.

19. A system for detecting a leak in a boiler in which a temperature control liquid in a containment means is supplemented with feedwater and removed as blowdown comprising:
  measuring means in communication with chemical tracer addition means;
  concentration determination means in communication with said temperature control liquid;
  measuring means in communication with said blowdown means;
  measuring means in communication with said feedwater supplementation means;
  derivation means in communication with said feedwater addition means for deriving a change of said feedwater rate with respect to time;
  mass derivation means for determining mass of said temperature control liquid;
  derivation means in communication with said chemical tracer concentration means for deriving the change of said concentration with respect to time;
  unaccounted for water rate derivation means in communication with said chemical tracer addition means, said concentration determination means, said blowdown measuring means, said feedwater rate change derivation means, said mass derivation means, and said chemical tracer concentration derivation means; and
  comparison means in communication with said unaccounted for water rate determination means for comparing with zero.

20. The system as claimed in claim 19 wherein said addition means comprises a tracer source coupled with a flow measurement apparatus and a feed line.

21. The system as claimed in claim 19 wherein said mass determination means comprises processing means coupled with said supplementation and said removal measuring means.

22. The system as claimed in claim 19 wherein said unaccounted for water rate determination means comprises processing means coupled with said supplementation and removal rate measuring means, said tracer addition means and said mass determination means.

* * * * *